United States Patent
Yang et al.

(10) Patent No.: US 8,112,127 B2
(45) Date of Patent: Feb. 7, 2012

(54) COMMUNICATION SYSTEM CAPABLE OF ADJUSTING POWER CONSUMED THEREBY

(75) Inventors: Chun-Wei Yang, Chia-Yi (TW); Chin-Wei Huang, Hsinchu (TW); An-Ming Lee, Hsinchu County (TW)

(73) Assignee: Realtek Semiconductor Corp., Hsinchu (TW)

( * ) Notice: Subject to any disclaimer, the term of this patent is extended or adjusted under 35 U.S.C. 154(b) by 406 days.

(21) Appl. No.: 12/433,070

(22) Filed: Apr. 30, 2009

(65) Prior Publication Data
US 2009/0286577 A1  Nov. 19, 2009

(30) Foreign Application Priority Data
May 16, 2008  (TW) .............................. 97118115 A

(51) Int. Cl.
*H04B 1/38* (2006.01)

(52) U.S. Cl. ........................................ 455/574; 455/78

(58) Field of Classification Search ................... 455/78, 455/574
See application file for complete search history.

(56) References Cited

U.S. PATENT DOCUMENTS

| 6,104,937 A * | 8/2000 | Fujimoto ..................... 455/574 |
| 7,536,197 B2 * | 5/2009 | Ginesi et al. .................. 455/522 |
| 7,768,977 B2 * | 8/2010 | Camp, Jr. ...................... 370/332 |

* cited by examiner

*Primary Examiner* — Brian Young
(74) *Attorney, Agent, or Firm* — Thomas, Kayden, Horstemeyer & Risley, LLP

(57) ABSTRACT

A communication system capable of adjusting power consumed thereby is adapted for receiving connection information. The communication system includes first and second transceiving devices. The first transceiving device includes a transmitting end and a service end for receiving the connection information. The second transceiving device includes a receiving end capable of forming a communications link with the transmitting end. A power state of each of the first and second transceiving devices is switchable between a power-supplied mode and a power-saving mode. The power state alters status of the communications link.

14 Claims, 4 Drawing Sheets

COMMUNICATION SYSTEM CAPABLE OF ADJUSTING POWER CONSUMED THEREBY

CROSS-REFERENCE TO RELATED APPLICATION

This application claims priority of Taiwanese application no. 097118115, filed on May 16, 2008.

BACKGROUND OF THE INVENTION

1. Field of the Invention

This invention relates to a technology for reducing power consumption, more particularly to a communication system capable of adjusting power consumed thereby.

2. Description of the Related Art

In order to enable a communication system to perform signal transmission at any time, power supply to transceiving devices within the communication system is maintained. Maintenance of the power supply enables the communication system to perform real-time processing, as well as to prevent signal loss and to ensure transmission quality. For instance, regardless of whether the communication system receives a connection signal, the power supply to the transceiving device operatively associated with a physical (PHY) layer, as well as the power supply to the transceiving device operatively associated with a media access control (MAC) layer, are maintained so as to enable communication between the transceiving devices through a serializer/deserializer (SerDes) interface.

Normally, the connection signal is not transmitted continuously to the communication system. When the connection signal is not being received by the communication system, the communication system remains idle, and consequently, power consumed by the transceiving devices is wasted.

SUMMARY OF THE INVENTION

Therefore, an object of the present invention is to provide a communication system capable of adjusting power consumed thereby through switching a power state.

According to the present invention, there is provided a communication system capable of adjusting power consumed thereby. The communication system is adapted for receiving connection information, and comprises first and second transceiving devices. The first transceiving device includes a transmitting end and a service end for receiving the connection information. The second transceiving device includes a receiving end capable of forming a communications link with the transmitting end. A power state of each of the first and second transceiving devices is switchable between a power-supplied mode and a power-saving mode. The power state alters status of the communications link.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE EMBODIMENT

Figure 1:
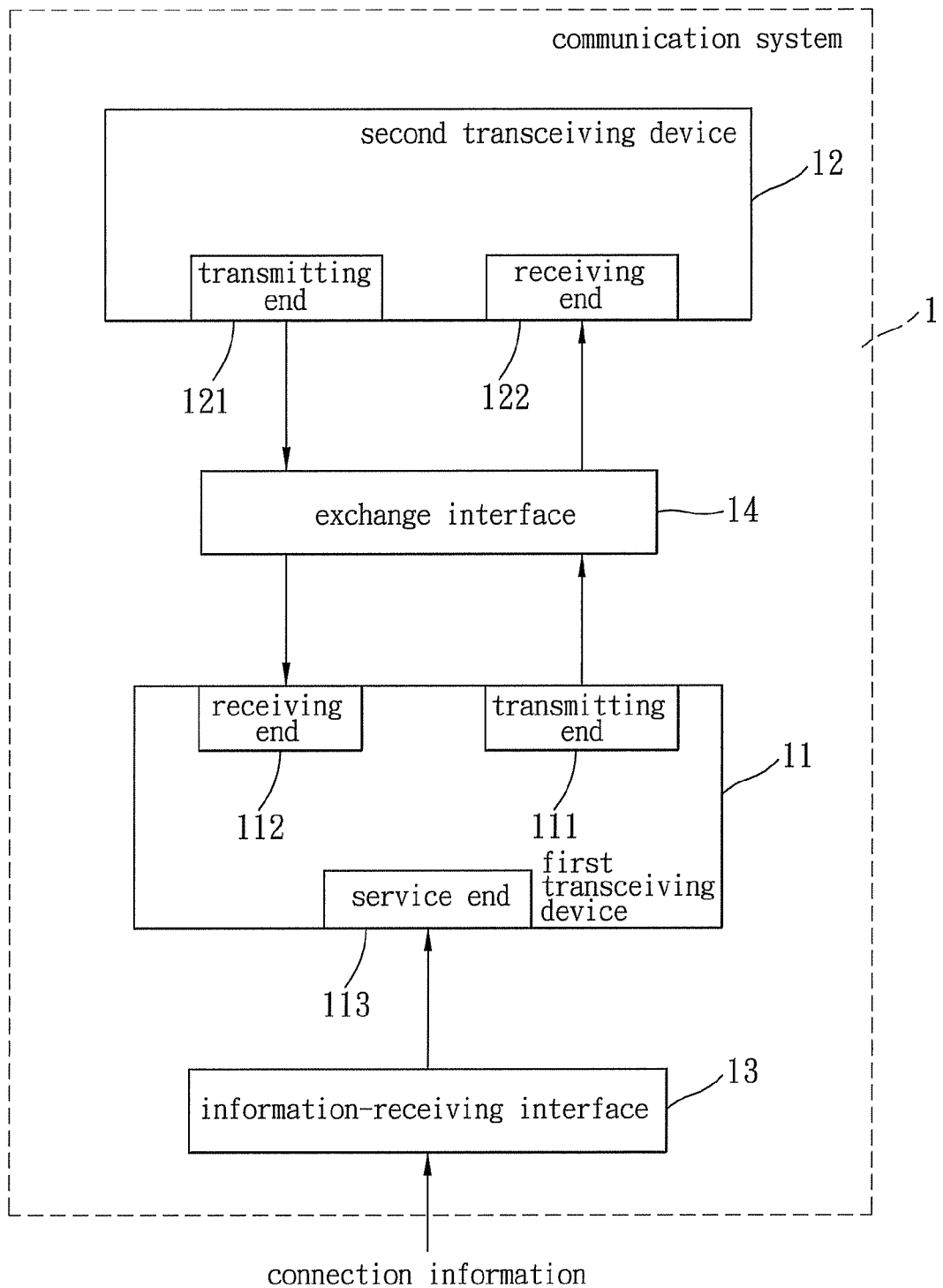
FIG. 1 is a schematic system block diagram of the embodiment of a communication system capable of adjusting power consumed thereby according to the present invention.

FIG. 1 illustrates the embodiment of a communication system 1 capable of adjusting power consumed thereby according to the present invention. The communication system 1 is adapted for receiving connection information, and comprises first and second transceiving devices 11,12, an information-receiving interface 13, and an exchange interface 14. Each of the first and second transceiving devices 11, 12 has a transmitting end 111, 121 and a receiving end 112, 122. The first transceiving device 11 further includes a service end 113 for receiving the connection information through the information-receiving interface 13. Each of the receiving ends 112,122 is capable of forming a communications link with a respective one of the transmitting ends 111,121 through the exchange interface 14. A power state of each of the first and second transceiving devices 11,12 is switchable between a power-supplied mode and a power-saving mode. The power state alters status of the communications links.

In this embodiment, the first transceiving device 11 is operatively associated with a physical (PHY) layer, and the second transceiving device 12 is operatively associated with a media access control (MAC) layer. The information-receiving interface 13 is a fiber optic interface. The exchange interface 14 is a serializer/deserializer (Ser/Des) interface. However, the information-receiving interface 13 can be an Unshielded Twisted Pair (UTP) interface, and the exchange interface 14 can be a Media Independent Interface (MII). The types of interfaces that can be implemented are not limited to what is disclosed herein.

Figure 3:
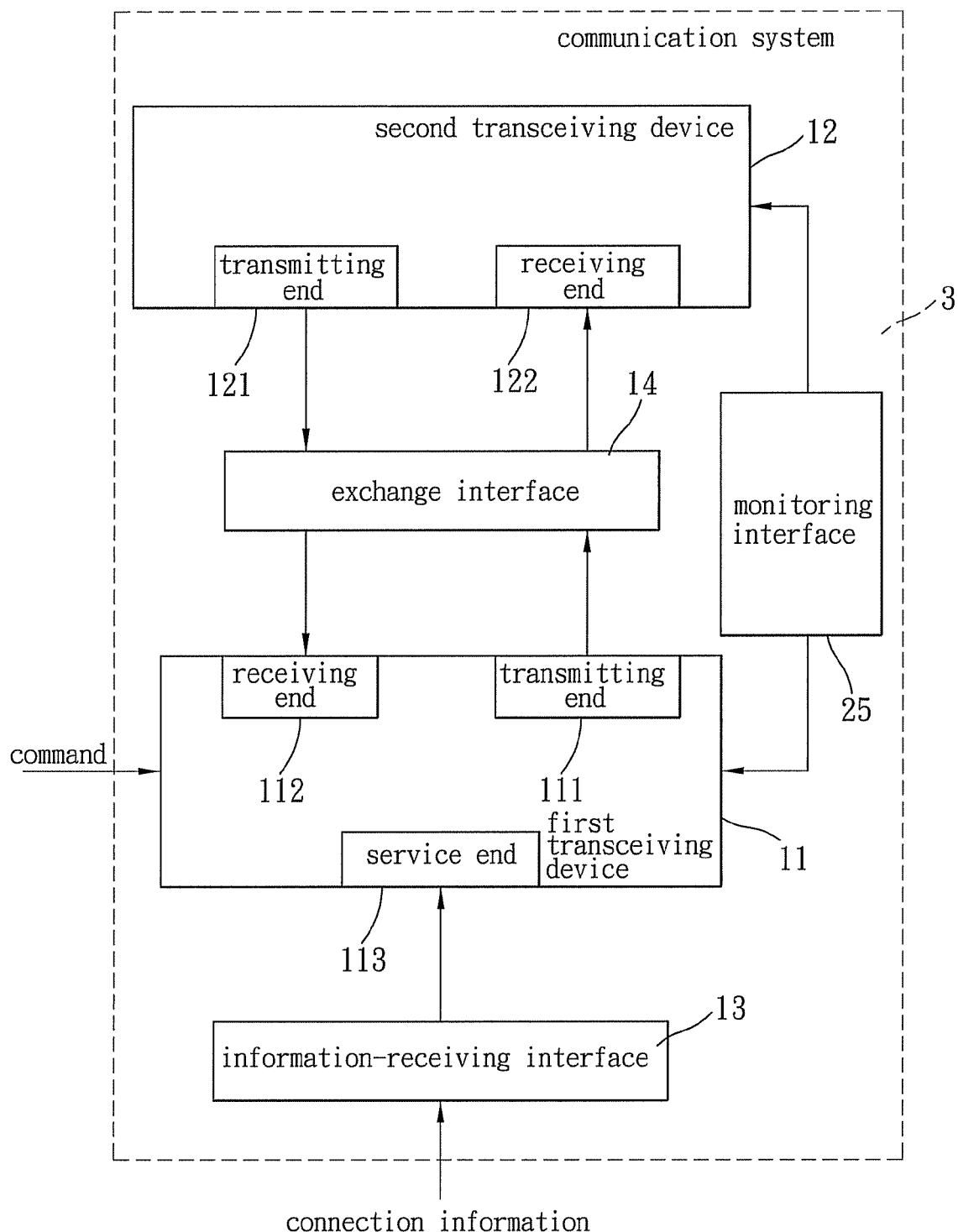
FIG. 3 is a schematic system block diagram to illustrate a passive mode of the embodiment, wherein a first transceiving device accepts a command from an external device.

The communication system 1 is operable in an active mode and a passive mode. Referring to FIG. 1, when operating in the active mode, the communication system 1 determines the power state of each of the first and second transceiving devices 11,12, and consequently, the status of the communications links, according to whether the service end 113 of the first transceiving device 11 receives the connection information. Referring to FIG. 3, the communication system 3 is adapted for receiving a command from an external device so as to enable operation in the passive mode. When operating in the passive mode, the communication system 3 determines the power state of each of the first and second transceiving devices 11,12, and consequently, the status of the communications links, according to the command received from the external device.

In order to describe in greater detail the manner in which the power state of each of the first and second transceiving devices 11,12 is switched in accordance with the active and passive modes of the communication system 1,3, three instances of operation in the active mode and two instances of operation in the passive mode are described in the following paragraphs. It should be noted that, in an initial period of operation of the communication system 1,3 in each of the instances to be described, the first and second transceiving devices 11,12 operate in the power-supplied mode.

Referring again to FIG. 1, in a first instance of operation of the communication system 1 in the active mode, when the service end 113 of the first transceiving device 11 no longer detects receipt of the connection information through the information-receiving interface 13, the first transceiving device 11 switches the transmitting end 111 and the receiving end 112 thereof to the power-saving mode. Consequently, no information is sent to the receiving end 122 of the second transceiving device 12. When the receiving end 122 of the second transceiving device 12 no longer detects presence of incoming information, the second transceiving device 12 switches the receiving end 122 and the transmitting end 121 thereof to the power-saving mode, thereby altering the status of the communication links so as to disable communication between the first and second transceiving devices 11,12.

Conversely, when the service end 113 of the first transceiving device 11 detects receipt of the connection information through the information-receiving interface 13, the first transceiving device 11 switches the transmitting end 111 and the receiving end 112 thereof to the power-supplied mode. When the receiving end 122 of the second transceiving device 12 detects presence of incoming information, the second transceiving device 12 switches the receiving end 122 and the transceiving end 121 thereof to the power-supplied mode, thereby altering the status of the communication links so as to enable communication between the first and second transceiving devices 11,12 through the exchange interface 14, such that the receiving ends 122,112 are able to receive information.

Figure 2:
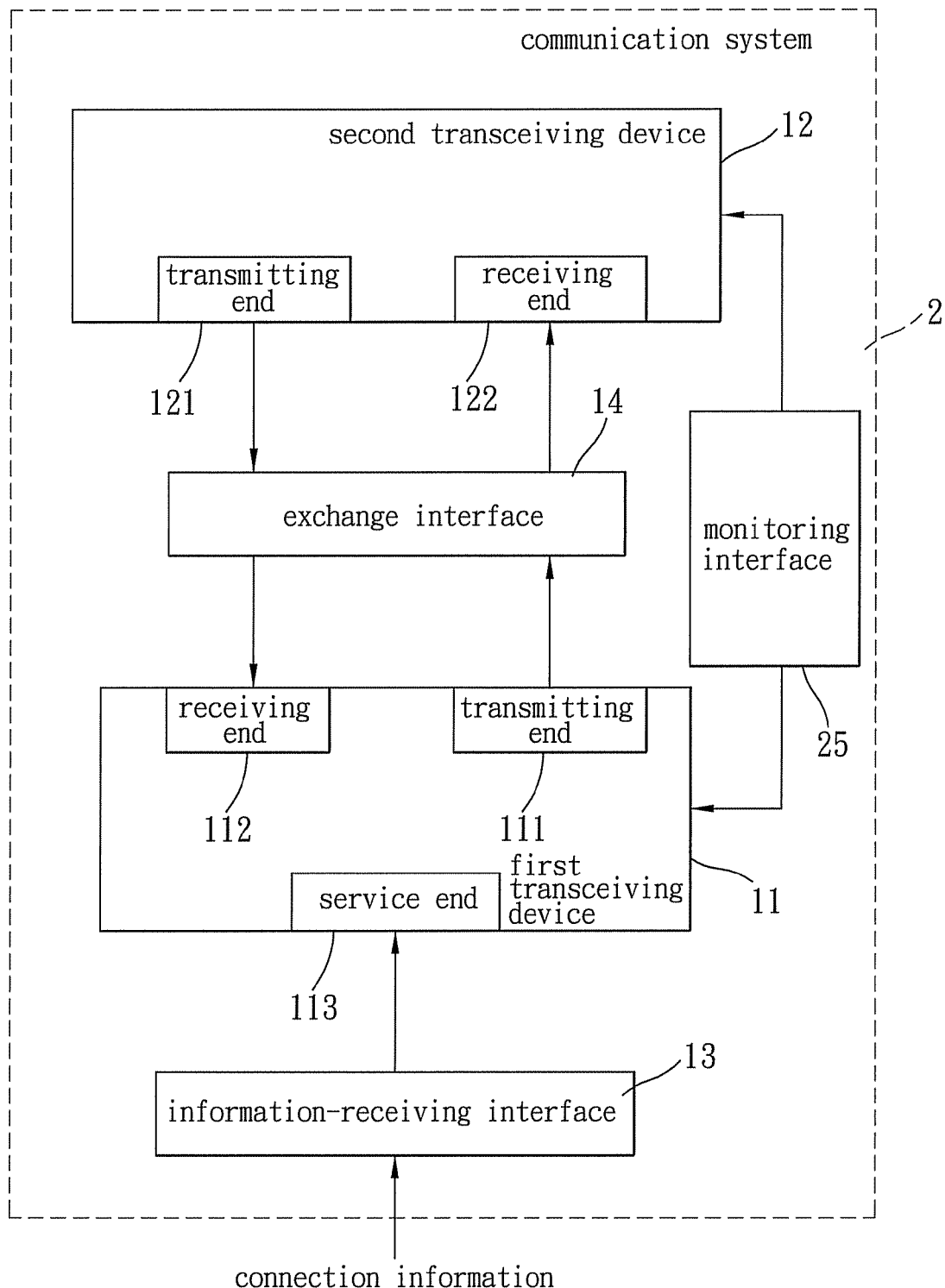
FIG. 2 is a schematic system block diagram to illustrate an active mode of the embodiment.

In a second instance of operation of the communication system 2 in the active mode as shown in FIG. 2, and in each of the instances of operation that follow, the communication system 2 further comprises a monitoring interface 25. In this instance, the monitoring interface 25 enables the second transceiving device 12 to detect the power state of the first transceiving device 11. When the service end 113 of the first transceiving device 11 no longer detects receipt of the connection information through the information-receiving interface 13, the first transceiving device 11 switches the transmitting end 111 and the receiving end 112 thereof to the power-saving mode. Subsequently, the second transceiving device 12 switches the transmitting end 121 and the receiving end 122 thereof to the power-saving mode after detecting the power-saving mode of the first transceiving device 11 through the monitoring interface 25.

Conversely, when the service end 113 of the first transceiving device 11 detects receipt of the connection information through the information-receiving interface 13, the first transceiving device 11 switches the transmitting end 111 and the receiving end 112 thereof to the power-supplied mode. Subsequently, the second transceiving device 12 switches the transmitting end 121 and the receiving end 122 thereof to the power-supplied mode after detecting the power-supplied mode of the first transceiving device 11 through the monitoring interface 25. Alternatively, the second transceiving device 12 can switch the transmitting end 121 and the receiving end 122 thereof to the power-supplied mode after detecting through the monitoring interface 25 receipt of the connection information by the service end 113 of the first transceiving device 11.

Referring again to FIG. 2, in a third instance of operation of the communication system 2 in the active mode, the monitoring interface 25 enables the first transceiving device 11 to accept a command from the second transceiving device 12 for switching between the power-supplied mode and the power-saving mode. When the command to enter the power-saving mode is issued from the second transceiving device 12 and passes through the monitoring interface 25, the command causes the first transceiving device 11 to switch the receiving end 112 and the transceiving end 111 thereof to the power-saving mode. The second transceiving device 12 also switches the receiving end 122 and the transceiving end 121 thereof to the power-saving mode.

Conversely, when the command to enter the power-supplied mode is issued from the second transceiving device 12 and passes through the monitoring interface 25, the command causes the first transceiving device 11 to switch the receiving end 112 and the transceiving end 111 thereof to the power-supplied mode. The second transceiving device 12 also switches the receiving end 122 and the transceiving end 121 thereof to the power-supplied mode. It is noted that, in this instance, the order in which the power states of the transmitting end 111, 121 and the receiving end 112,122 are switched can be reversed.

Referring to FIG. 3, in a first instance of operation of the communication system 3 in the passive mode, when the command received from the external device is for controlling the first transceiving device 11 to switch to the power-saving mode, the first transceiving device 11 switches the transmitting end 111 and the receiving end 112 thereof to the power-saving mode. Subsequently, the second transceiving device 12 switches the transmitting end 121 and the receiving end 122 thereof to the power-saving mode after detecting the power-saving mode of the first transceiving device 11 through the monitoring interface 25.

Conversely, when the command is for controlling the first transceiving device 11 to switch to the power-supplied mode, the first transceiving device 11 switches the transmitting end 111 and the receiving end 112 thereof to the power-supplied mode. Subsequently, the second transceiving device 12 switches the transmitting end 121 and the receiving end 122 thereof to the power-supplied mode after detecting the power-supplied mode of the first transceiving device 11 through the monitoring interface 25. Alternatively, the second transceiving device 12 can switch the power state of the transmitting end 121 and the receiving end 122 thereof based on whether the receiving end 122 of the second transceiving device 12 detects presence of incoming information.

Figure 4:
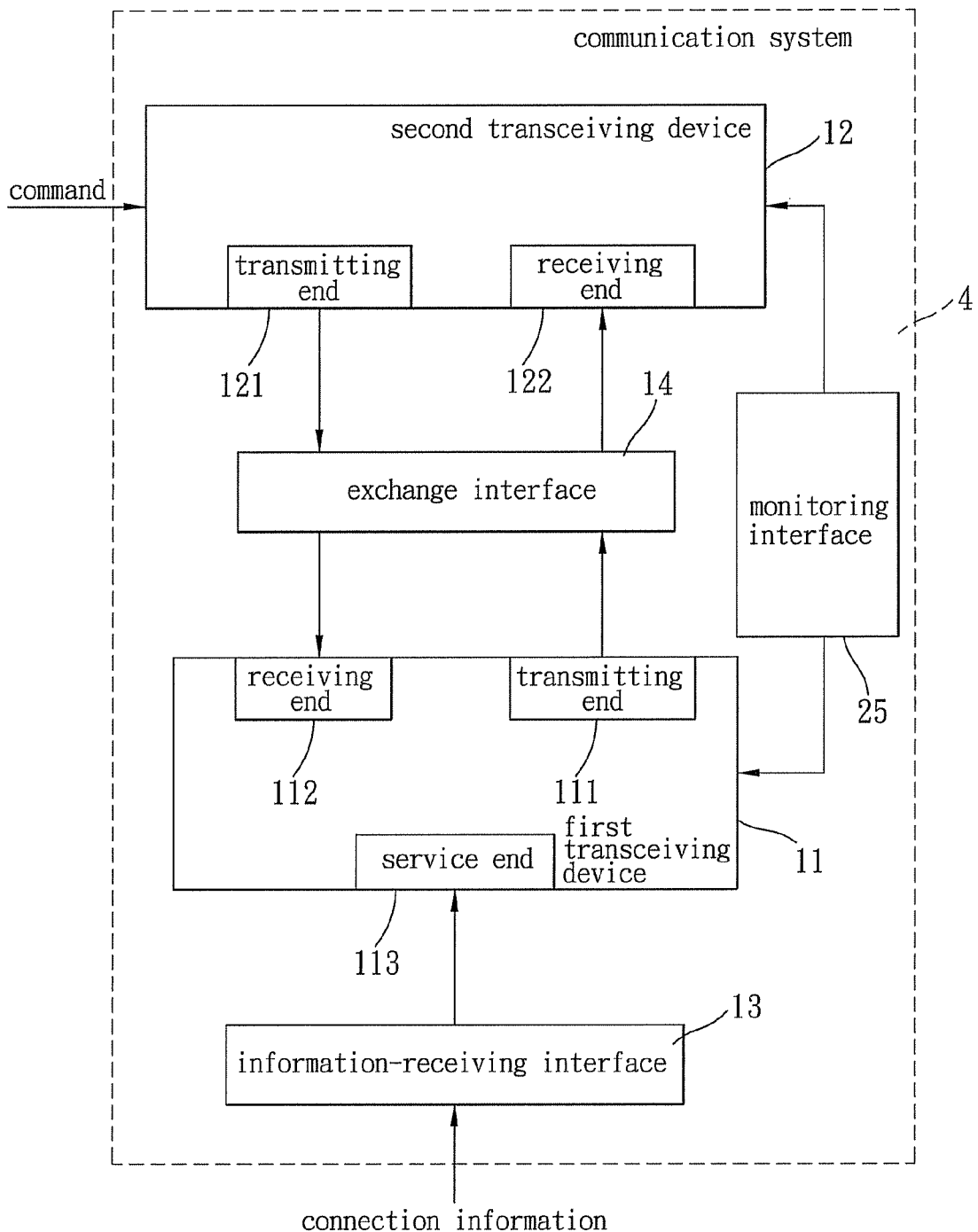
FIG. 4 is a schematic system block diagram to illustrate the passive mode of the embodiment, wherein a second transceiving device accepts the command from the external device.

Referring to FIG. 4, in a second instance of operation of the communication system 4 in the passive mode, when the command received from the external device is for controlling the second transceiving device 12 to switch to the power-saving mode, the second transceiving device 12 switches the transmitting end 121 and the receiving end 122 thereof to the power-saving mode. Subsequently, the first transceiving device 11 switches the transmitting end 111 and the receiving end 112 thereof to the power-saving mode after detecting the power-saving mode of the second transceiving device 12 through the monitoring interface 25.

Conversely, when the command is for controlling the second transceiving device 12 to switch to the power-supplied mode, the second transceiving device 12 switches the transmitting end 121 and the receiving end 122 thereof to the power-supplied mode. Subsequently, the first transceiving device 11 switches the transmitting end 111 and the receiving end 112 thereof to the power-supplied mode after detecting the power-supplied mode of the second transceiving device 12 through the monitoring interface 25. Alternatively, the first transceiving device 11 can switch the power state of the transmitting end 111 and the receiving end 112 thereof based on whether the receiving end 112 of the first transceiving device 11 detects presence of incoming information.

Regardless of the operational mode of the communication system 1~4, the present invention is not limited to what is described above. Moreover, the power-saving mode can be a state in which no power is consumed, or a state in which power consumption is significantly lower than power consumption in the power-supplied mode, such as one-tenth of the power consumption of the power-supplied mode. Taking the receiving end 122 of the second transceiving device 12 as an example, if the power-saving mode is one of reduced power consumption as described above, then the receiving end 122 of the second transceiving device 12 can continue to detect presence of incoming information, so as to enable the second transceiving device 12 to switch to the power-supplied mode when necessary. Similarly, if the power-saving mode is one of reduced power consumption, the service end 113 of the first transceiving device 11 can continue to detect incoming connection information, so as to enable the first transceiving device 11 to switch to the power-supplied mode when necessary.

In sum, the communication system 1~4 according to the present invention is capable of adjusting power consumed thereby. When operating in the active mode, power consumption of the communication system 1,2 is adjusted based on receipt of the connection information by the service end 113 of the first transceiving device 11, or issue of the command from the first transceiving device 11. When operating in the passive mode, power consumption of the communication system 3,4 is adjusted based on receipt of the command from an external device by one of the first and second transceiving devices 11,12. The communication system 1~4 of the present invention thus ensures economization of power consumption.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A communication system capable of adjusting power consumed thereby, said communication system being adapted for receiving connection information, and comprising:
    a first transceiving device comprising a transmitting end and a service end for receiving the connection information; and
    a second transceiving device including a receiving end capable of forming a communications link with said transmitting end;
    wherein:
        a power state of each of said first and second transceiving devices is switchable between a power-supplied mode and a power-saving mode, said power state altering status of the communications link;
        the power state of each of said first and second transceiving devices switches between said power-supplied mode and said power-saving mode according to whether or not said service end receives the connection information;
        when said service end of said first transceiving device no longer detects receipt of the connection information, said first transceiving device switches said transmitting end to said power-saving mode, so as to cause said second transceiving device to switch said receiving end to said power-saving mode, thereby disabling communication between said first and second transceiving devices; and
        when said service end of said first transceiving device detects receipt of the connection information, said first transceiving device switches said transmitting end to said power-supplied mode, so as to cause said second transceiving device to switch said receiving end to said power-supplied mode, thereby enabling communication between said first and second transceiving devices such that said receiving end is able to receive information.

2. The communication system capable of adjusting power consumed thereby as claimed in claim 1, wherein said first transceiving device further comprises a receiving end, said second transceiving device further comprises a transmitting end, and
    said first and second transceiving devices accept a command for switching said power state of respective ones of said transmitting ends and said receiving ends between said power-supplied mode and said power-saving mode.

3. The communication system capable of adjusting power consumed thereby as claimed in claim 1, wherein said first transceiving device further comprises a receiving end, said second transceiving device further comprises a transmitting end, and
    when said transmitting end and said receiving end of said first transceiving device operate in said power-supplied mode, said second transceiving device switches said transmitting end and said receiving end thereof to said power-supplied mode after said receiving end of said second transceiving device detects presence of incoming information.

4. The communication system capable of adjusting power consumed thereby as claimed in claim 1, further comprising a monitoring interface, wherein said first transceiving device further comprises a receiving end, said second transceiving device further comprises a transmitting end, and
    when said transmitting end and said receiving end of said first transceiving device operate in said power-supplied mode, said second transceiving device switches said transmitting end and said receiving end thereof to said power-supplied mode after detecting said power state of said first transceiving device through said monitoring interface.

5. The communication system capable of adjusting power consumed thereby as claimed in claim 1, further comprising a monitoring interface, wherein said first transceiving device further comprises a receiving end, said second transceiving device further comprises a transmitting end, and
    when said transmitting end and said receiving end of said first transceiving device operate in said power-supplied mode, said second transceiving device switches said transmitting end and said receiving end thereof to said power-supplied mode after detecting through said monitoring interface receipt of the connection information by said service end of said first transceiving device.

6. The communication system capable of adjusting power consumed thereby as claimed in claim 2, further comprising a monitoring interface, wherein said command is issued from said first transceiving device and passes through said monitoring interface, said command causing said second transceiving device to switch said receiving end and said transceiving end thereof between said power-supplied mode and said power-saving mode.

7. The communication system capable of adjusting power consumed thereby as claimed in claim 2, said command being issued from an external device, wherein, when said command is for controlling one of said first and second transceiving devices to switch to said power-supplied mode, said one of said first and second transceiving devices switches said transmitting end and said receiving end thereof to said power-supplied mode, and subsequently, the other one of said first and second transceiving devices switches said transmitting end and said receiving end thereof to said power-supplied mode.

8. The communication system capable of adjusting power consumed thereby as claimed in claim 7, further comprising a monitoring interface, wherein said other one of said first and second transceiving devices switches said power state thereof based on said power state of said one of said first and second transceiving devices, said other one of said first and second transceiving devices detecting said power state of said one of said first and second transceiving devices through said monitoring interface.

9. The communication system capable of adjusting power consumed thereby as claimed in claim 7, wherein said other one of said first and second transceiving devices switches said power state thereof based on whether said receiving end of said other one of said first and second transceiving devices receives incoming information.

10. A communication system capable of adjusting power consumed thereby, said communication system being adapted for receiving connection information, and comprising:
 a first transceiving device comprising a transmitting end and a service end for receiving the connection information; and
 a second transceiving device including a receiving end capable of forming a communications link with said transmitting end;
 wherein a power state of each of said first and second transceiving devices is switchable between a power-supplied mode and a power-saving mode, said power state altering status of the communications link;
 wherein said first transceiving device is operatively associated with a physical layer, and said second transceiving device is operatively associated with a media access control layer.

11. The communication system capable of adjusting power consumed thereby as claimed in claim 1, further comprising an exchange interface for linking said transmitting end and said receiving end of said first and second transceiving devices.

12. A communication system capable of adjusting power consumed thereby, said communication system being adapted for receiving connection information, and comprising:
 a first transceiving device comprising a transmitting end and a service end for receiving the connection information;
 a second transceiving device including a receiving end capable of forming a communications link with said transmitting end; and
 an exchange interface for linking said transmitting end and said receiving end of said first and second transceiving devices;
 wherein a power state of each of said first and second transceiving devices is switchable between a power-supplied mode and a power-saving mode, said power state altering status of the communications link;
 wherein said exchange interface is a serializer/deserializer interface.

13. The communication system capable of adjusting power consumed thereby as claimed in claim 1, wherein said power-saving mode is a state in which no power is being consumed.

14. The communication system capable of adjusting power consumed thereby as claimed in claim 1, wherein said power-saving mode is a state in which power consumption is significantly lower than power consumption in said power-supplied mode.

\* \* \* \* \*